US012681213B2

(12) United States Patent
Wheatley et al.

(10) Patent No.: US 12,681,213 B2
(45) Date of Patent: Jul. 14, 2026

(54) TWO-FACTOR AUTHENTICATION FILM

(71) Applicant: 3M INNOVATIVE PROPERTIES COMPANY, St. Paul, MN (US)

(72) Inventors: John A. Wheatley, Stillwater, MN (US); Gilles J. Benoit, Minneapolis, MN (US); Mark A. Roehrig, Stillwater, MN (US); Bharat R. Acharya, Woodbury, MN (US); Serena L. Schleusner, Roberts, WI (US); Zhaohui Yang, North Oaks, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 464 days.

(21) Appl. No.: 18/266,052

(22) PCT Filed: Dec. 17, 2021

(86) PCT No.: PCT/IB2021/061949
§ 371 (c)(1),
(2) Date: Jun. 8, 2023

(87) PCT Pub. No.: WO2022/137060
PCT Pub. Date: Jun. 30, 2022

(65) Prior Publication Data
US 2024/0036235 A1 Feb. 1, 2024

Related U.S. Application Data

(60) Provisional application No. 63/128,287, filed on Dec. 21, 2020.

(51) Int. Cl.
| | |
|---|---|
| *G02B 1/111* | (2015.01) |
| *G02B 5/20* | (2006.01) |
| *G06V 40/13* | (2022.01) |

(52) U.S. Cl.
CPC .............. *G02B 1/111* (2013.01); *G02B 5/208* (2013.01); *G06V 40/1318* (2022.01)

(58) Field of Classification Search
CPC .. G02B 1/111; G02B 1/11; G02B 1/10; G02B 1/08; G02B 5/208; G02B 5/26;
(Continued)

(56) References Cited

U.S. PATENT DOCUMENTS

| | | | |
|---|---|---|---|
| 6,157,486 A * | 12/2000 | Benson, Jr. ............ | G02B 5/287 |
| | | | 359/530 |
| 2019/0347386 A1 | 11/2019 | Rahmel et al. | |
| 2020/0335032 A1* | 10/2020 | Kiik ........................ | H04N 23/20 |

FOREIGN PATENT DOCUMENTS

| | | |
|---|---|---|
| KR | 20170053019 A | 5/2017 |
| WO | 1999036258 A1 | 7/1999 |

(Continued)

OTHER PUBLICATIONS

International Search report for PCT International Application No. PCT/IB2021/061949, mailed on Mar. 21, 2022, 7 pages.
(Continued)

*Primary Examiner* — Stephone B Allen
*Assistant Examiner* — Adam W Booher
(74) *Attorney, Agent, or Firm* — Jonathan L. Tolstedt

(57) ABSTRACT

An optical film (100) includes a plurality of polymeric layers (40) disposed between opposing first (11) and second (12) outer layers, a thinnest polymeric layer in the plurality of polymeric layers disposed closer to the first outer layer (11) and a thickest polymeric layer disposed closer to the second outer layer (12). A layer thickness gradient of the optical film (100) includes first (43) and second (45) portions joined by a step portion (20), a change in thickness across the step portion (20) at least 5 times greater than a change in thickness across each of the first (43) and second (45)
(Continued)

portions, wherein the optical film (100) has a first average transmission percentage, TA1, in a first wavelength range, a peak transmission percentage, Tp, in a different, second wavelength range. The first wavelength range and the second wavelength range are separated by a third wavelength range with a third average transmission percentage, TA3, such that $TA1 > Tp > 30(TA3)$.

19 Claims, 10 Drawing Sheets

(58) Field of Classification Search
CPC .......... G02B 5/28; G02B 5/281; G02B 5/285; G02B 5/287; G02B 5/223; G02B 5/30; G02B 5/3025; G02B 5/3033; G02B 5/3041; G02B 5/305; G02B 5/3083; G02B 27/28; G02B 27/283; G06V 40/1318; G06V 40/1312; G06V 40/1324
See application file for complete search history.

(56) References Cited

FOREIGN PATENT DOCUMENTS

| WO | 1999036805 A1 | 7/1999 |
| WO | 1999036809 A1 | 7/1999 |
| WO | 2017127734 A1 | 7/2017 |
| WO | 2018166186 A1 | 9/2018 |
| WO | 2020053832 A1 | 3/2020 |

OTHER PUBLICATIONS

Matsumoto, "Impact of artificial "gummy" fingers on fingerprint systems", Proceedings SPIE, Optical Security and Counterfeit Deterrence Techniques IV, Apr. 2002, vol. 4677.
Mohsin, "Real-Time Remote Health Monitoring Systems Using Body Sensor Information and Finger Vein Biometric Verification: A Multi-Layer Systematic Review", Journal of Medical Systems, 2018, vol. 42, No. 12. Abstract Only.
Soumya, "A Low-cost Smart Vein Viewer System", IEEE International Symposium on Smart Electronic Systems (iSES) (Formerly iNiS), 2018, pp. 114-117.

* cited by examiner

100

| Case | #1 | #2 | #3 | #4 | #5 | #6 |
|------|------|------|------|------|------|------|
| JND - RHemi | 0.044278 | 0.044278 | 0.868665 | 3.369343 | 6.975878 | 10.90074 |
| Tnotch - T0 | 0% | 18% | 42% | 87% | 92% | 93% |

$$\Delta E_{ab}{}^* = \sqrt{(a_2{}^* - a_1{}^*)^2 + (b_2{}^* - b_1{}^*)^2}$$

TWO-FACTOR AUTHENTICATION FILM

CROSS REFERENCE TO RELATED APPLICATIONS

This application is a national stage filing under 35 U.S.C. 371 of PCT/IB2021/061949, filed Dec. 17, 2021, which claims the benefit of U.S. Provisional Application No. 63/128,287, filed Dec. 21, 2020, the disclosures of which are incorporated by reference in their entireties herein.

SUMMARY

In some aspects of the present description, an optical film is provided, including a plurality of polymeric layers numbering at least 200 in total disposed between, and co-extruded and co-stretched with, opposing first and second outer layers. Each of the polymeric layers has an average thickness of less than about 150 nm. A thinnest polymeric layer in the plurality of polymeric layers is disposed closer to the first outer layer and a thickest polymeric layer in the plurality of polymeric layers is disposed closer to the second outer layer. A layer thickness gradient of the optical film includes first and second portions joined by a step portion, where each of the first and second portions extends across at least 30 of the polymeric layers, and the step portion extends across less than about 10 of the polymeric layers. A change in thickness across the step portion is at least 5 times greater than a change in thickness across each of the first and second portions. The optical film has a first average transmission percentage, TA1, in a first wavelength range (e.g., a near-infrared range), a peak transmission percentage, Tp, in a different second wavelength range (e.g., a human-visible range), and the first wavelength range and the second wavelength range are separated by a third wavelength range with a third average transmission percentage TA3, such that each of the first and third wavelength ranges at least about 100 nm wide, the second wavelength range less than about 50 nm wide, TA1>Tp>30(TA3).

In some aspects of the present description, a light reflecting film is provided, the light reflecting film including a plurality of polymeric layers numbering at least 200 in total. A plot of an average layer thickness versus a layer number of the plurality of polymeric layers includes a step portion separating a left portion where the polymeric layers have lower layer numbers from a right portion where the polymeric layers have higher layer numbers, with each of the left and right portions extending across at least 30 sequentially arranged of the polymeric layers. An optical transmittance of the light reflecting film versus wavelength comprises a peak at a peak wavelength with a corresponding full width at half maximum (FWHM) in a visible wavelength range, separating a lower wavelength range from a higher wavelength range, the lower and higher wavelength ranges extending across M1 nanometers, such that the ratio M1/FWHM≥1.5. For substantially normally incident light, the plurality of polymeric layers has an average transmittance TA2 across each of the lower and higher wavelength ranges, and a transmittance Tp at the peak wavelength, such that the ratio of Tp/TA2 is greater than or equal to 30.

In some aspects of the present description, an optical system is provided, the optical system including a display configured to display an image to a viewer, a light source configured to emit light having blue, green, red, and near infrared emission spectra having respective blue, green, red, and near infrared full width at half maximum (FWHM), and an optical film disposed between the light source and the display. The optical film has a first average transmission percentage, TA1, in a first wavelength range, a peak transmission percentage, Tp, in a different second wavelength range. The first wavelength range and the second wavelength range are separated by a third wavelength range with a third average transmission percentage TA3. Each of the first and third wavelength ranges are at least about 100 nm wide, and the second wavelength range is less than about 50 nm wide, such that TA1>Tp>30(TA3). A FWHM corresponding to the peak transmission in the second wavelength range is less than at least each of the green, red, and near infrared FWHMs.

In some aspects of the present description, an optical reflector is provided, the optical reflector including a plurality of polymeric layers numbering at least 200 in total. Each of the polymeric layers has an average thickness of less than about 500 nm. A layer thickness gradient of the polymeric layers includes a first portion and a second portion joined by a step portion. Each of the first and second portions extends across at least 30 of the polymeric layers, and the step portion extends across less than about 10 of the polymeric layers. A change in thickness across the step portion is at least 5 times greater than a change in thickness across each of the first and second portions. For a substantially normally incident light, the plurality of polymeric layers has an average optical reflectance of greater than about 80% in a visible wavelength range extending from about 420 nm to about 700 nm, and an optical transmittance versus wavelength that includes a bandpass segment with a global peak transmittance of between about 2% and about 80% at a global peak wavelength in the visible wavelength range and a corresponding full width at half maximum (FWHM) of between about 10 nm and about 50 nm.

In some aspects of the present description, an optical reflector is provided, the optical reflector including a plurality of polymeric layers numbering at least 200 in total. Each of the polymeric layers has an average thickness of less than about 500 nm. For a substantially normally incident light, the plurality of polymeric layers has an average optical reflectance of greater than about 80% in a visible wavelength range extending from about 420 nm to about 700 nm, and an optical transmittance versus wavelength that includes a bandpass segment with a global peak transmittance of greater than about 2% at a global peak wavelength in the visible wavelength range and a corresponding full width at half maximum (FWHM) of at least 5 nm. When a substantially white Lambertian light having first color coordinates a1* and b1* in a CIE Lab color space illuminates the optical reflector, the optical reflector reflects the illuminating white light. The reflected light has respective second color coordinates a2* and b2* averaged over all angles of reflectance. A color difference ΔE*(ab) between the first and second color coordinates is less than about 10.

In some aspects of the present description, an optical reflector is provided, the optical reflector including a plurality of polymeric layers numbering at least 200 in total. Each of the polymeric layers has an average thickness of less than about 500 nm. For a substantially normally incident light, the plurality of polymeric layers has an average optical reflectance of greater than about 80% in a visible wavelength range extending from about 420 nm to about 700 nm, and an optical transmittance versus wavelength that includes a bandpass segment with a global peak transmittance at a global peak wavelength in the visible wavelength range and a corresponding full width at half maximum (FWHM). When a substantially white Lambertian light is incident on the optical reflector, the optical reflector reflects the incident white light, wherein a difference ΔE*(ab) between color coordinates (a1*, b1*) of the incident light in a CIE Lab color space and color coordinates (a2*, b2*) of the reflected light in the CIE Lab color space averaged over all angles of reflectance, is between about 0.01 and about 0.5.

DETAILED DESCRIPTION

Figure 1A:
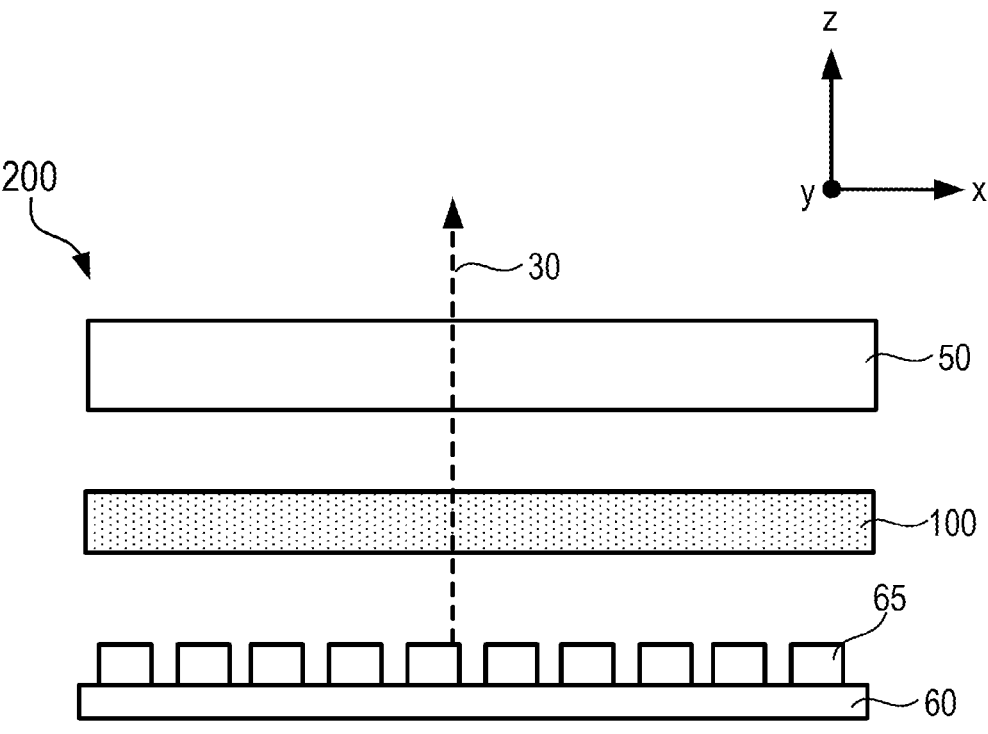
FIGS. 1A and 1B show side views of an optical system including an optical film for two-factor authentication, in accordance with an embodiment of the present description.

In the following description, reference is made to the accompanying drawings that form a part hereof and in which various embodiments are shown by way of illustration. The drawings are not necessarily to scale. It is to be understood that other embodiments are contemplated and may be made without departing from the scope or spirit of the present description. The following detailed description, therefore, is not to be taken in a limiting sense.

Increasingly, mobile devices are being created with additional security features, such as biometric identification. These methods can be as simple as a skin surface fingerprint, or they can combine two or more biometric factors, including, but not limited to, fingerprint or handprint identification, identification of subsurface features (e.g., vein patterns), heart rate, blood oxygen levels, or any other appropriate biometric factors. There is also an increasing desire to avoid circumvent security issues such as "spoofing," for example, when someone uses a fake or lifted fingerprint to fool a fingerprint sensor. It is also desirable to perform "liveness" detection on a subject trying to access a device, to prevent someone from using a disembodied digit, for example, to gain access to a system protected by a fingerprint system. One method of doing this is by creating a photoplethysmogram (PPG), which is an optical trace that can be used to detect blood volume changes in the microvascular bed of the tissue of a subject. This type of measurement typically determines the different absorptive properties of oxygenated blood and deoxygenated blood, and often uses two different wavelengths of light to do the comparison. For example, the different measurements may be done at around 620 nm (a human-visible wavelength) and around 940 nm (in the near infrared).

According to some aspects of the present description, an optical film is provided which can be used to perform a type of two-factor authentication on a consumer electronic device. In some embodiments, the optical film may be a multi-layer optical film with a discontinuous layer profile, such that, for a target wavelength, there are no layers with an optical thickness close to a quarter-wave at the target wavelength (i.e., the multi-layer optical film is not strongly reflective as the target wavelength since none of the layers of the film are resonant at the target wavelength). This can be used to create an optical film with high transmission in an infrared wavelength (e.g., around 940 nm, allowing for fingerprint identification using infrared, or for measuring the absorptive properties of blood in the infrared) and also have a narrow band of higher transmission in a human-visible wavelength (e.g., around 620 nm, allowing for measuring the absorptive properties of blood in a human-visible wavelength). In some embodiments, this narrow band of transmission in the visible may be a spike of transmission that is high (e.g., over 80% transmission) but narrow (e.g., a full width at half maximum, or FWHM, of less than 20 nm), such that the visible transmission is enough to use for a biometric measurement but does not significantly alter the color of a display). In other embodiments, the band of transmission in the visible may be wider (e.g., a FWHM of greater than 40 nm) but shorter (e.g., less than 30% transmission), which may be enough visible energy to perform a biometric measurement, but a low enough transmission percentage to avoid significantly altering the display color.

In some embodiments, the optical film may be part of an optical system. In some embodiments, the optical system may include a transceiver configured to emit emitted light toward a measurement subject (e.g., a finger or face of a user) and receive reflected light reflected by the measurement subject, and the optical film disposed between the transceiver and the measurement subject. In some embodiments, the emitted light of the transceiver may include at least one of wavelengths of light in the first wavelength range and wavelengths of light in the second wavelength range. For example, a smart watch may include a transceiver which emits light from a back side of the watch (i.e., a side proximate to the skin of the user) and receive light reflected from the measurement subject (i.e., light reflected from the skin of the user) in order to perform certain biometric functions.

According to some aspects of the present description, an optical film includes a plurality of polymeric layers numbering at least 200, or at least 300, or at least 500, in total disposed between, and co-extruded and co-stretched with, opposing first and second outer layers. In some embodiments, each of the polymeric layers may have an average thickness of less than about 150 nm. In some embodiments, the thinnest polymeric layer of the plurality of polymeric layers may be disposed closer to the first outer layer, and the thickest polymeric layer may be disposed closer to the second outer layer.

In some embodiments, a layer thickness gradient of the optical film may include first and second portions joined by a step portion, where each of the first and second portions extends across at least 30 of the polymeric layers, and the step portion extends across less than about 10 of the polymeric layers. In some embodiments, the first and second portions may be substantially linear. That is, in some embodiments, a best linear fit to each of the first and second portions may have an R-squared value that is greater than or equal to about 0.8, or about 0.85, or about 0.90. In some embodiments, a change in thickness across the step portion may be at least 5 times greater than a change in thickness across each of the first and second portions.

In some embodiments, the optical film may have a first average transmission percentage, TA1, in a first wavelength range (e.g., a near-infrared range), and a peak transmission percentage, Tp, in a different second wavelength range (e.g., a human-visible, or visible, range). In some embodiments, the first wavelength range and the second wavelength range may be separated by a third wavelength range with a third average transmission percentage TA3. In some embodiments, each of the first and third wavelength ranges may be at least about 100 nm wide, and the second wavelength range may be less than about 50 nm wide, or less than about 40 nm wide, or less than about 30 nm wide. In some embodiments, the first average transmission percentage, TA1, may be greater than the peak transmission percentage, Tp, and Tp may be significantly greater than the third average transmission percentage, TA3 (e.g., Tp may be greater than 30 times TA3, or 40 times TA3, or 50 times TA3, or 60 times TA3). In some embodiments, TA1 may be greater than about 80%, or greater than about 85%, or greater than about 90%. In some embodiments, Tp may be greater than about 30%, or greater than about 40%, or greater than about 50%.

In some embodiments, the first wavelength range may be a near infrared wavelength range extending from about 800 nm to about 2000 nm, and the second wavelength range may be a human-visible wavelength range extending from about 550 nm to about 700 nm. In some embodiments, the first wavelength range may be one of a visible and a near infrared wavelength range, and the second wavelength range may be the other of the visible and the near infrared wavelength range. Stated another way, there may be some applications in which the peak transmission percentage is a peak in the near infrared wavelengths, and the first wavelength range may be a visible wavelength range. It should be noted that, for the purposes of this specification, the term "near infrared" (NIR) shall be defined to include wavelengths of light in the range from about 680 nm to about 2000 nm. Also, the terms "human-visible" and "visible" shall be considered to be synonymous for the purposes of this specification.

In some embodiments, the optical film as described herein may have a variety of embodiments and represent a variety of system functions. For example, the optical film may be a reflector, a reflective polarizer, an absorbing polarizer, a partial reflector, and a diffusor.

In some embodiments, an optical stack may include two or more of any of the optical films as described herein. In some embodiments, at least one optical characteristic (e.g., optical transmission, or optical reflectance) for at least one of the two or more optical films may vary by at least 10 percent for two orthogonal polarization states, where the same optical characteristic for the other optical film is substantially the same for the two orthogonal polarization states. For example, a first film of the optical films of the optical stack may substantially reflect light of a first polarization state (e.g., light with a p-pol polarization type) and substantially transmit light of an orthogonal second polarization type (e.g., light with an s-pol polarization type, while a second film of the optical films may substantially transmit light of both polarization types.

In some embodiments, an optical system may include a display configured to emit light having blue, green, red, and near infrared emission spectra and any of the optical films described herein. Each of the emission spectra of the display may have respective blue, green, red, and near infrared full width at half maximum (FWHM) values, and the optical film may exhibit a FWHM value corresponding to the peak transmission in the second wavelength range that is less than at least each of the green, red, and near infrared FWHM values. In some embodiments, the FWHM of the peak transmission in the second wavelength range may also be less than the blue FWHM value. Stated another way, in some embodiments, the peak transmission may be represented by a narrow "spike" of transmission values that is less than (narrower than) the width of the corresponding light source emission spectra curves, thus minimizing any negative effects in the visual quality of the display (but allowing a peak transmission in a narrow wavelength range to enable sensing of optical characteristics for authentication and other purposes).

According to some aspects of the present description, a light reflecting film includes a plurality of polymeric layers numbering at least 200 in total. A plot of an average layer thickness versus a layer number of the plurality of polymeric layers includes a step portion separating a left portion (where the polymeric layers have lower layer numbers) from a right portion (where the polymeric layers have higher layer numbers), with each of the left and right portions extending across at least 30 sequentially arranged of the polymeric layers. In some embodiments, an optical transmittance of the light reflecting film versus wavelength may include a peak at a peak wavelength with a corresponding full width at half maximum (FWHM) in a visible wavelength range (i.e., a human-visible wavelength range), separating a lower wavelength range from a higher wavelength range, the lower and higher wavelength ranges extending across M1 nanometers, such that the ratio M1/FWHM is greater than or equal to about 1.5, or greater than about 2.0, or greater than about 3.0. In some embodiments, for substantially normally incident light, the plurality of polymeric layers may have an average transmittance TA2 across each of the lower and higher wavelength ranges, and a transmittance Tp at the peak wavelength, such that the ratio of Tp/TA2 is greater than or equal to about 30, or about 40, or about 50. In some embodiments, Tp may be greater than about 70%, or about 80%, or about 90%.

In some embodiments, each of the left and right portions of the plot of an average layer thickness versus a layer number may be substantially linear. In such embodiments, a best linear fit of each of the first and second substantially linear portions may have an R-squared value greater than or equal to about 0.8, or about 0.85, or about 0.90.

In some embodiments, for a substantially normally incident light, the plurality of polymeric layers may have an average transmittance TA1 in an infrared wavelength ranges, such that TA1 is greater than or equal to Tp, and wherein each of the visible and infrared wavelength ranges is at least about 200 nm wide.

According to some aspects of the present description, an optical system includes a display configured to display an image to a viewer, a light source configured to emit light having blue, green, red, and near infrared emission spectra having respective blue, green, red, and near infrared full width at half maximum (FWHM), and an optical film disposed between the light source and the display. In some embodiments, the optical film may have a first average transmission percentage, TA1, in a first wavelength range (e.g., a near infrared wavelength range), a peak transmission percentage, Tp, in a different second wavelength range (e.g., a visible wavelength range). In some embodiments, the first wavelength range and the second wavelength range may be separated by a third wavelength range with a third average transmission percentage, TA3. In some embodiments, each of the first and third wavelength ranges may be at least about 100 nm wide, and the second wavelength range may be less than about 50 nm wide, such that TA1 is greater than Tp, and Tp is greater than 30 times TA3, or 40 times TA3, or 50 times TA3. In some embodiments, an FWHM corresponding to the peak transmission in the second wavelength range may be less than at least each of the green, red, and near infrared FWHMs. In some embodiments, the FWHM of the peak transmission in the second wavelength range may also be less than the blue FWHM value. In some embodiments, the light source may include one or more of a display backlight and a light source external to the display backlight (e.g., the light source may include a display backlight emitting the blue, green, and red emission spectra, and a separate LED emitting the infrared emission spectra.)

According to some aspects of the present description, an optical reflector includes a plurality of polymeric layers numbering at least 200 in total. In some embodiments, each of the polymeric layers may have an average thickness of less than about 500 nm. In some embodiments, a layer thickness gradient of the polymeric layers may include a first portion and a second portion joined by a step portion. In some embodiments, each of the first and second portions may extend across at least 30 of the polymeric layers, and the step portion may extend across less than about 10 of the polymeric layers. In some embodiments, a change in thickness across the step portion may be at least 5 times greater than a change in thickness across each of the first and second portions. In some embodiments, the step portion may have a negative slope. In some embodiments, the step portion may have a positive slope. In some embodiments, the step portion may be substantially vertical.

In some embodiments, for a substantially normally incident light, the plurality of polymeric layers may have an average optical reflectance of greater than about 80%, or greater than about 85%, or greater than about 90%, in a visible wavelength range extending from about 420 nm to about 700 nm, and may have an optical transmittance versus wavelength that comprises a bandpass segment comprising a global peak transmittance of between about 2% and about 80%, or between about 2% and about 60%, or between about 2% and about 40%, at a global peak wavelength in the visible wavelength range and a corresponding full width at half maximum (FWHM) of between about 10 nm and about 50 nm, or between about 10 nm and about 40 nm, or between about 10 nm and about 30 nm, or between about 10 nm and about 20 nm.

In some embodiments, the optical reflector may have an average optical reflectance of greater than about 80%, or greater than about 85%, or greater than about 90%, in the visible wavelength range for each of mutually orthogonal polarization states.

In some embodiments, the optical reflector may be part of an optical system. In some embodiments, the optical system may include a light source and the optical reflector. In some embodiments, the light source may be configured to emit emitted light toward a measurement subject (e.g., the finger of a user) and receive reflected light reflected by the measurement subject. In some embodiments, the optical reflector may be disposed between the light source and the measurement subject.

According to some aspects of the present description, an optical reflector includes a plurality of polymeric layers numbering at least 200 in total. In some embodiments, each of the polymeric layers may have an average thickness of less than about 500 nm. In some embodiments, for a substantially normally incident light, the plurality of polymeric layers may have an average optical reflectance of greater than about 80%, or greater than about 85%, or greater than about 90%, in a visible wavelength range extending from about 420 nm to about 700 nm, and an optical transmittance versus wavelength that includes a bandpass segment with a global peak transmittance of greater than about 2% at a global peak wavelength in the visible wavelength range and a corresponding full width at half maximum (FWHM) of at least 5 nm. In some embodiments, when a substantially white Lambertian light having first color coordinates a1* and b1* in a CIE Lab color space illuminates the optical reflector, the optical reflector may reflect the illuminating white light, with the reflected light having respective second color coordinates a2* and b2* averaged over all angles of reflectance, wherein a color difference ΔE*(ab) between the first and second color coordinates is less than about 10.

In some embodiments, the optical reflector may have an average optical reflectance of greater than about 80%, or greater than about 85%, or greater than about 90%, in the visible wavelength range for each of mutually orthogonal polarization states.

In some embodiments, the optical reflector may be part of an optical system. In some embodiments, the optical system may include a light source and the optical reflector. In some embodiments, the light source may be configured to emit the substantially white Lambertian light toward a measurement subject (e.g., a finger or skin of a user) and receive the reflected light. In some embodiments, the optical reflector may be disposed between the light source and the measurement subject.

According to some aspects of the present description, an optical reflector includes a plurality of polymeric layers numbering at least 200 in total. In some embodiments, each of the polymeric layers may have an average thickness of less than about 500 nm. In some embodiments, for a substantially normally incident light, the plurality of polymeric layers may have an average optical reflectance of greater than about 80%, or greater than about 85%, or greater than about 90%, in a visible wavelength range extending from about 420 nm to about 700 nm, and may have an optical transmittance versus wavelength that includes a bandpass segment with a global peak transmittance at a global peak wavelength in the visible wavelength range and a corresponding full width at half maximum (FWHM). In some embodiments, when a substantially white Lambertian light is incident on the optical reflector, the optical reflector may reflect the incident white light, wherein a difference ΔE*(ab) between color coordinates (a1*, b1*) of the incident light in a CIE Lab color space and color coordinates (a2*, b2*) of the reflected light in the CIE Lab color space averaged over all angles of reflectance, is between about 0.01 and about 0.5.

In some embodiments, the optical reflector may have an average optical reflectance of greater than about 80%, or greater than about 85%, or greater than about 90%, in the visible wavelength range for each of mutually orthogonal polarization states.

In some embodiments, the optical reflector may be part of an optical system. In some embodiments, the optical system may include a light source and the optical reflector. In some embodiments, the light source may be configured to emit the substantially white Lambertian light toward a measurement subject (e.g., a finger or skin of a user) and receive the reflected light. In some embodiments, the optical reflector may be disposed between the light source and the measurement subject.

Figure 1B:
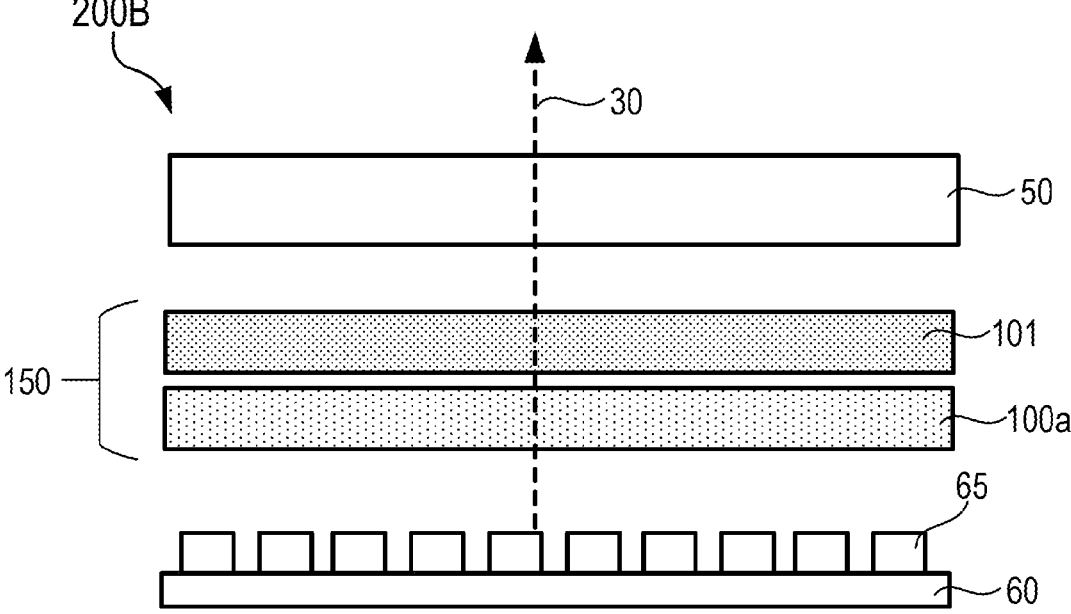

Turning now to the figures, FIGS. 1A and 1B show side views of an optical system including an optical film for two-factor authentication, according to the present description. The embodiments shown in each of FIGS. 1A and 1B are similar and share many like-numbered components. The function of like-numbered components should be assumed to be the same in each figure unless specifically stated otherwise, and thus the descriptions of these components may not be duplicated for each figure. Starting with FIG. 1A, an optical system 200 includes a display 50, a backlight 60 including a plurality of light sources 65 (e.g., light-emitting diodes), and an optical film 100 disposed between display 50 and backlight 60. In some embodiments, the backlight 60 (via light sources 65) is configured to emit light 30 having blue, green, red, and near infrared emission spectra.

Figure 6A:
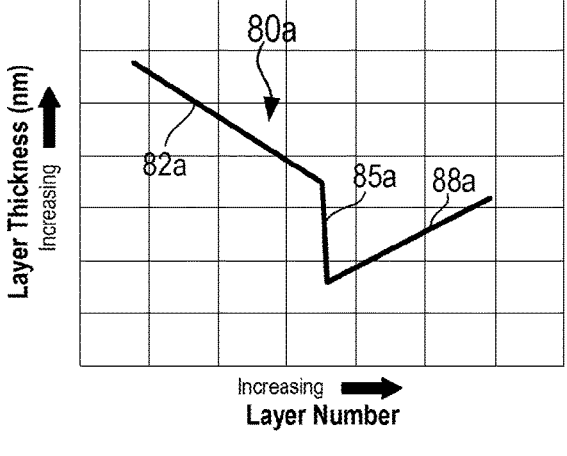
FIGS. 6A-6C provide plots of alternate layer thickness profiles for an optical film for two-factor authentication, in accordance with an embodiment of the present description.
Figure 6B:
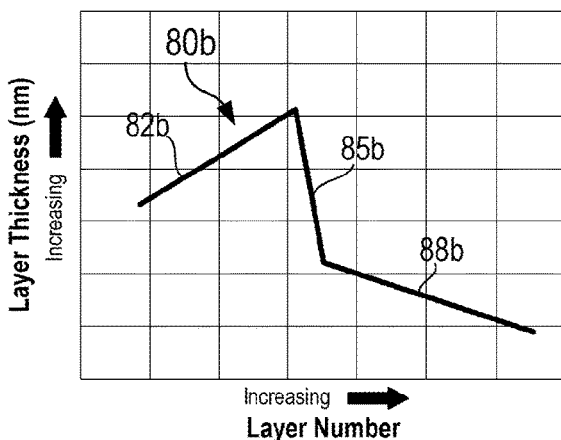

Turning temporarily to FIGS. 6A-6B, these figures provide additional detail on the emission spectra emitted by light sources 65. FIG. 6A shows the typical emission spectra for backlight light sources such as light-emitting diodes. FIG. 6A shows the emission spectra for blue light 90b, green light 90g, and red light 90r. Each of the spectra 90b, 90g, and 90r has a corresponding full width at half maximum (FWHM) value, as shown in FIG. 6A. In this example, the FWHM for the blue spectra 90b is about 25 nm, the FWHM for the green spectra 90g is about 40 nm, and the FWHM for the red spectra 90r is about 25 nm. FIG. 6B shows a typical emission spectra for an infrared light emitting diode 90ir. The infrared spectra 90ir has a corresponding FWHM value of about 45 nm. The shape (including the height and width) of each of the spectra curves in FIGS. 6A and 6B are relevant to the functional performance of the optical film 100, to be discussed elsewhere herein.

Returning to FIG. 1A, optical film 100 may include a plurality of polymeric layers numbering at least 200, or at least 300, or at least 400, or at least 500, or at least 600 in total disposed between, and co-extruded with, opposing first and second outer layers. In some embodiments, each of the polymeric layers may have an average thickness of less than about 150 nm, and may be arranged in a layer thickness gradient with a thinnest polymeric layer disposed closer to the first outer layer and a thickest polymeric layer disposed closer to the second outer layer. In some embodiments, the layer thickness gradient of optical film 100 may be configured such that the optical film has a first average transmission percentage in a first wavelength range (e.g., a near infrared wavelength range) and a peak transmission percentage in a different second wavelength range (e.g., the peak of a narrow "spike" or notch of transmission in a visible wavelength range). Stated another way, the optical film 100 may be so configured as to substantially allow the transmission of wavelengths in at least two distinct wavelength ranges to enable the use of the film in applications requiring biometric authentication using two different wavelengths of light. Additional details on the construction and performance of optical film 100 are provided elsewhere herein.

FIG. 1B shows an optical system 200B that is similar to optical system 200 of FIG. 1A, except that an optical stack 150 replaces the single optical stack 100 of the embodiments in FIG. 1A. Optical stack 150 includes two or more optical films 100a and 101, both of which may be substantially similar to optical film 100 of FIG. 1A. At least one of the optical films 100a and 101 may be configured to exhibit different optical characteristics based on the polarization type of the light passing through the film. For example, optical film 101 may be substantially identical to optical film 100 of FIG. 1A except that it substantially transmits light 30 of one polarization type (e.g., light with a linear p-pol polarization type) and substantially (or partially) blocks light 30 of a second, orthogonal polarization (e.g., light with a linear s-pol polarization type). In some embodiments, the other optical film 100a may be substantially identical to optical film 100 of FIG. 1A and may substantially transmit both orthogonal polarization types of light. In some embodiments, at least one of the films 100a and 101 may be configured to either transmit or reflect light based on the polarization type of the light 30. The use of linear s-pol and linear p-pol polarization types in this description are examples only, and other polarization types (e.g., linear vs. circular polarization type) may also be appropriate and within the scope of the description. Also, it should be noted that other configurations of the optical stack are possible, and that the optical film 100 (or films 100a, 101) may be used to implement optical films with additional functions, including, but not limited to, films such as a reflector, a reflective polarizer, an absorbing polarizer, partial reflector, and a diffuser.

Figure 2:
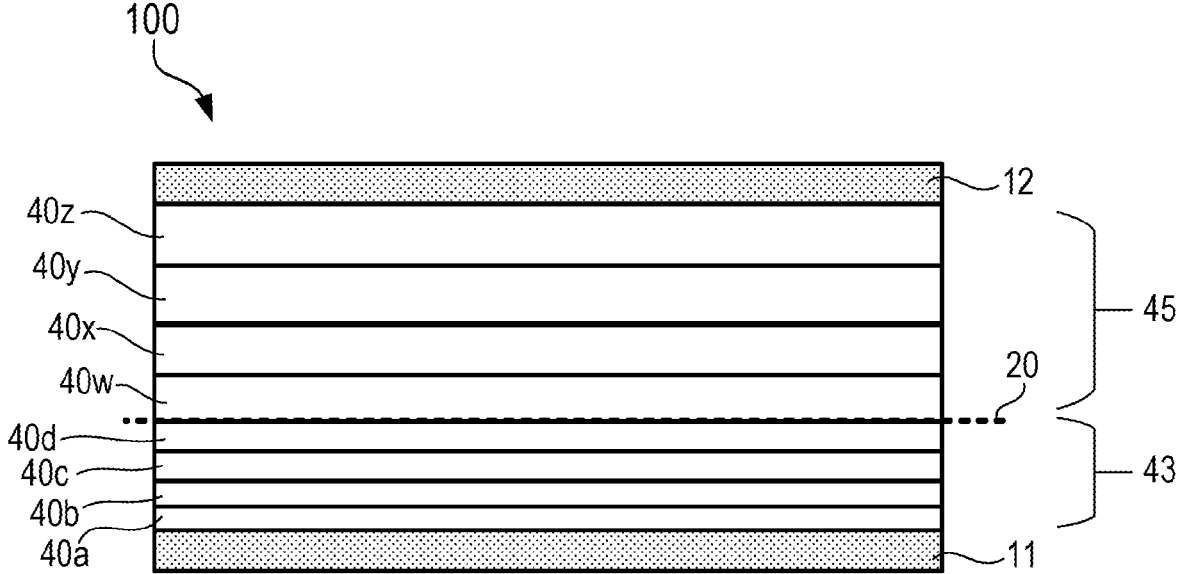
FIG. 2 illustrates the layers of an optical film for two-factor authentication, in accordance with an embodiment of the present description.

FIG. 2 provides additional details on the construction of optical film 100 of FIG. 1A, according to the present description. In some embodiments, optical film 100 includes a plurality of polymeric layers 40 (including layers 40a-40d and 40w-40z) numbering at least 200 in total disposed between, and co-extruded and co-stretched with, a first outer layer 11 and an opposing second outer layer 12. In some embodiments, each of the polymeric layers 40 may an average thickness of less than about 150 nm. In some embodiments, a thinnest polymeric layer 40a in the plurality of polymeric layers may be disposed closer to first outer layer 11, and a thickest polymeric layer 40z may be disposed closer to second outer layer 12.

The plurality of polymeric layers 40 may be divided into two or more sections 43 and 45. Within each of sections 43 and 45, a layer thickness gradient for each section may be substantially linear. In some embodiments, in between sections 43 and 45, there may be a discontinuity 20 (e.g., a non-linear step in layer width between layer 40d and 40w). This step in width for discontinuity 20 may be at least about 5 times greater than the corresponding step changes in thickness across each of section 43 and 45. Additional detail on the layer thickness gradient of optical film 100 can be seen in FIG. 5 discussed elsewhere herein.

Figure 3:
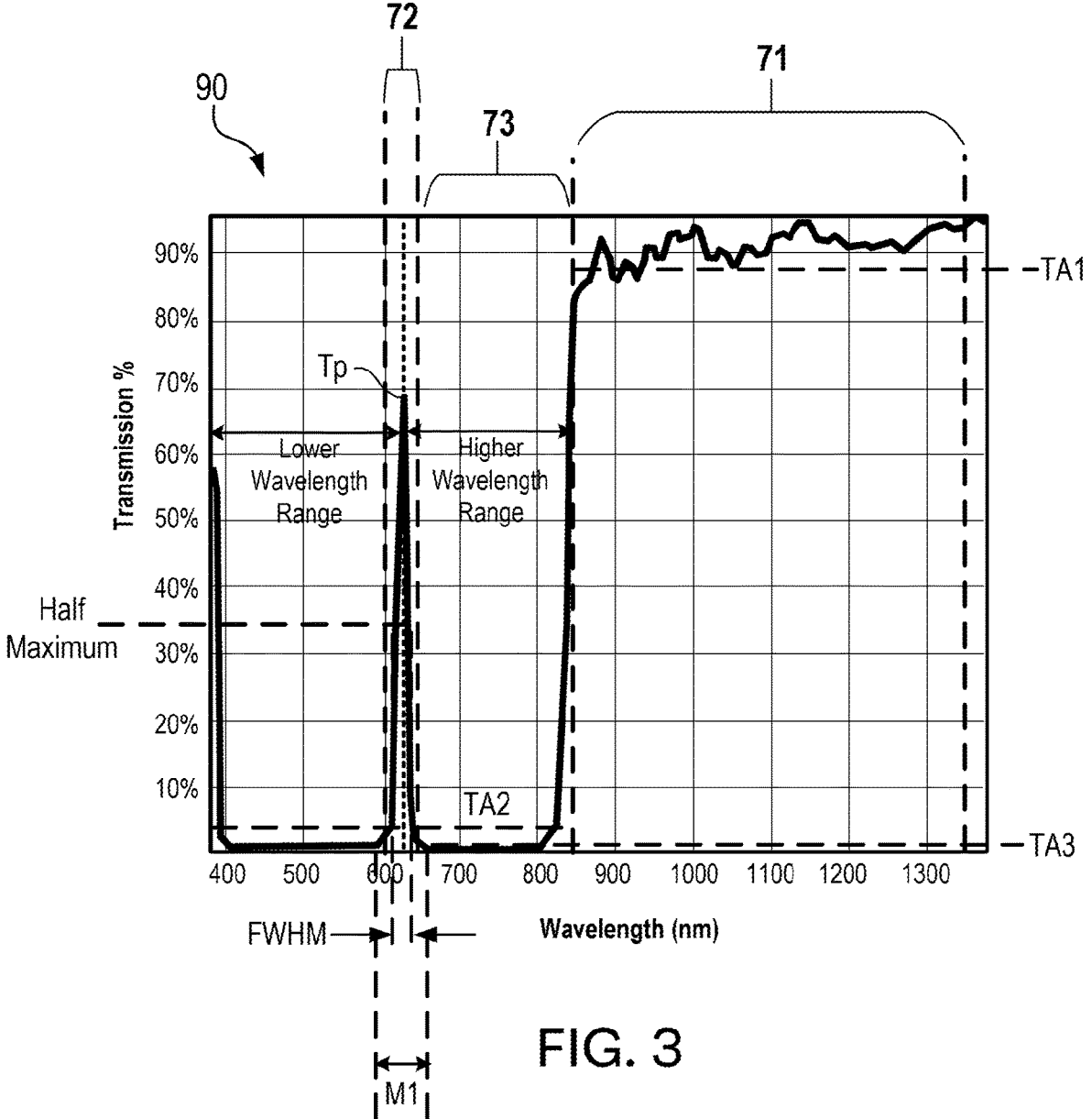
FIG. 3 provides a plot of transmission percent versus wavelength for an optical film for two-factor authentication, in accordance with an embodiment of the present description.

FIG. 3 provides a plot 90 of transmission percent versus wavelength for an optical film for two-factor authentication, according to the present description. Plot 90 is an example plot for one embodiment of optical film 100 (see, for example, FIG. 1A). Other embodiments consistent with or providing variants of the present description are possible. Plot 90 may be divided into three primary wavelength ranges of interest. A first wavelength range 71 which exhibits a first average transmission percentage TA1, a second wavelength range 72 exhibiting a peak transmission percentage Tp, and a third wavelength range 73 exhibiting a third average transmission percentage TA3. In the embodiment of FIG. 3, first wavelength range 71 is a near infrared wavelength range and second wavelength range 72 is a narrow notch transmission disposed in the visible wavelength range. However, other embodiments may be configured where first wavelength range 71 and second wavelength range 72 are substantially swapped (i.e., that is, where first wavelength range 71 extends across visible wavelengths and the narrow notch of second wavelength range 72 is disposed within the near infrared wavelengths).

In some embodiments, the first average transmission percentage TA1 may be greater than peak transmission percentage Tp. In some embodiments, peak transmission percentage Tp may be greater than third average transmission percentage TA3. In some embodiments, peak transmission percentage Tp may be greater than 30 times TA3, or greater than 40 times TA3, or greater than 50 times TA3.

In some embodiments, optical film 100 as represented by plot 90 may substantially transmit light in a near infrared wavelength range. In some embodiments, this near infrared wavelength range (i.e., first wavelength range 71) may extend from about 700 nm to about 2000 nm, or from about 800 nm to about 1500 nm, or from about 840 nm to about 1300 nm. In some embodiments, optical film 100 as represented by plot 90 may also substantially transmit light in a narrow visible wavelength range. In some embodiments, this visible wavelength range (i.e., second wavelength range 72) may extend from about 550 nm to about 700 nm, or from about 600 nm to about 700 nm, or from about 610 nm to about 680 nm.

In some embodiments, plot 90 may have a peak Tp at a peak wavelength with a corresponding full width at half maximum (FWHM) in the visible wavelength range. The peak Tp may separate a lower wavelength range from a higher wavelength range. In some embodiments, such as the example of FIG. 3, the lower and higher wavelength ranges may extend across M1 nanometers, such that the ratio of M1/FWHM is greater than or equal to about 1.5, or about 2.0, or about 2.5, or about 3.0. Stated another way, the FWHM associated with peak Tp may be configured such that it is relatively narrow, in order to minimize the amount of light in the visible wavelength range that is transmitted and which may contribute to a negative effect on the display image quality. In some embodiments, there is a second average transmission percentage TA2 exhibited across the wavelength range including the lower wavelength range and higher wavelength range (such as those shown in FIG. 3). In some embodiments, optical film 100 (see, for example, FIG. 1A) may be configured such that the ratio Tp/TA2 is greater than or equal to about 30, or about 40, or about 50.

Figure 4A:
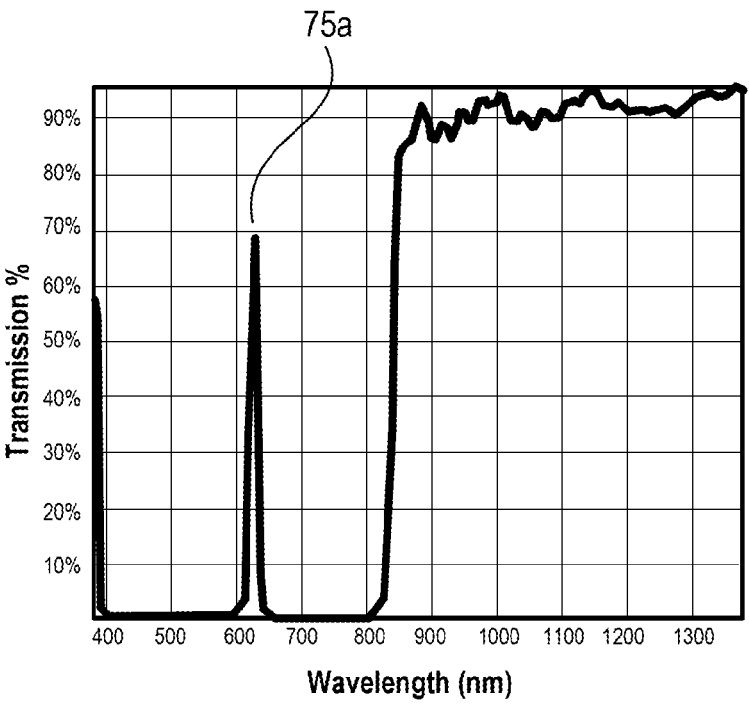
FIGS. 4A and 4B illustrate different embodiments of an optical film for two-factor authentication, in accordance with an embodiment of the present description.
Figure 4B:
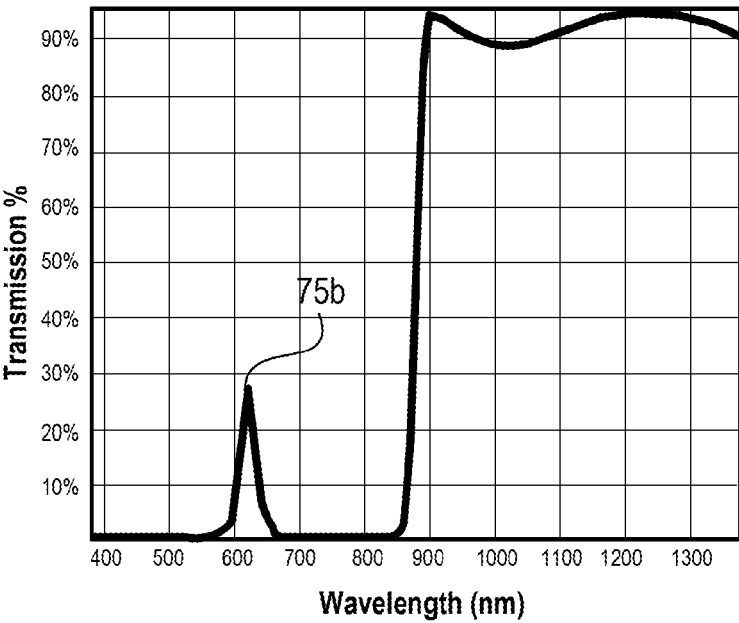

As the optical films described herein may be configured to allow transmission of light in two separate wavelength ranges to enable two-factor authentication, a near infrared range and a visible range, care must be taken that any light transmitted in the visible wavelength range does not have a significant (negative) effect on the image quality seen at the display. That is, if visible wavelengths are used in an authentication scheme (e.g., light around 620 nm for use in determining information related to an absorptive property of blood), that visible light may create a visible effect that may be perceived on the display. To mitigate this negative defect, the visible wavelengths may be limited in either wavelength range (e.g., a very narrow transmission spike) or transmission percentage (e.g., a shorter spike with less transmission "power"). FIGS. 4A and 4B provide example plots of transmission percentage versus wavelength for two different embodiments of an optical film. In FIG. 4A, the optical film is configured such that it exhibits a single, narrow "spike" transmission 75a, which is relatively tall (i.e., has a nearly 70% transmission at the peak wavelength) but quite narrow (i.e., extends across only a small range of wavelengths, from about 615 nm to about 640 nm). In FIG. 4B, the optical film is configured such that it exhibits a shorter, wider transmission region 75b, which is relatively short (i.e., about 28% transmission peak) but which extends across a larger range of wavelengths (i.e., extends about 590 nm to about 660 nm). The transmission curve and peak of the optical film may be configured as required for a particular application. In some applications, for instance, a transmission peak around 30% may be adequate to be detected for use in the authentication procedure, depending on the performance of the sensor used. Both of the embodiments of FIG. 4A and FIG. 4B provide ways of limiting the effect of the visible light transmitted on the visual appearance of the display.

Figure 5:
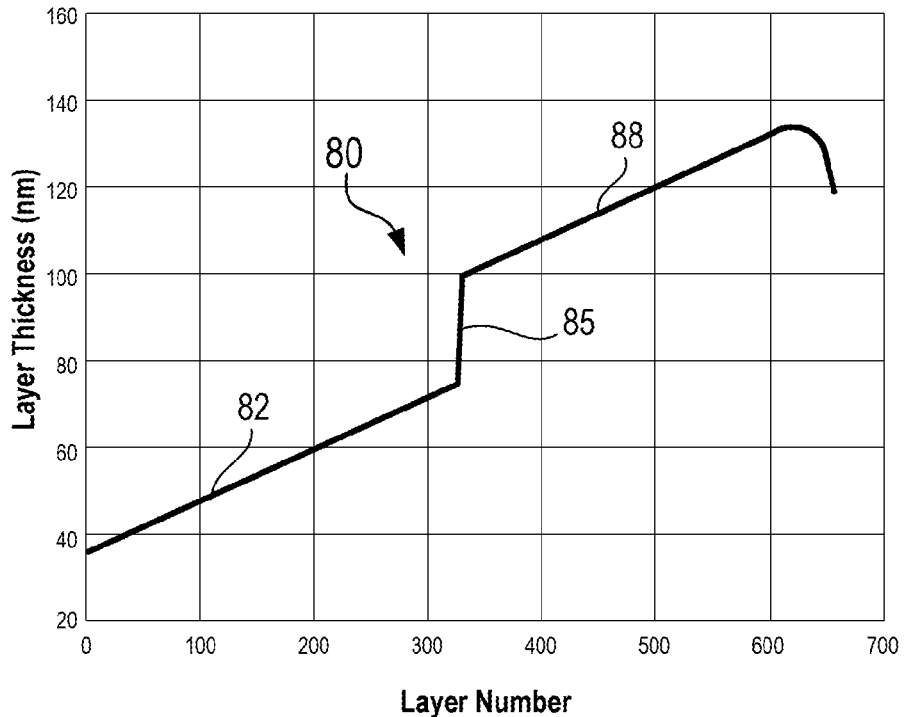
FIG. 5 is a layer thickness profile for an optical film for two-factor authentication, in accordance with an embodiment of the present description.

FIG. 5 is a plot showing a layer thickness profile for an embodiment of the optical films described herein. Layer thickness gradient 80 is a plot of layer thickness in nanometers (nm) on the y-axis versus layer number on the x-axis. The layer thickness gradient 80 includes a first portion 82 and a second portion 88. In some embodiments, each of first portion 82 and second portion 88 are substantially linear portions. In some embodiments, for example, a best linear fit to each of the first portion 82 and second portion 88 may have an R-squared value greater than or equal to about 0.8, or about 0.85, or about 0.90. In some embodiments, each of the first portion 82 and second portion 88 may extend across at least 30, or at least 40, or at least 50, or at least 100, or at least 200, polymeric layers. In some embodiments, the first portion 82 and second portion 88 are separated by a step portion 85 which may extend across less than about 10 of the polymeric layers. The change in thickness across the step portion 85 may be at least 5 times greater than a change in thickness across each of the first portion 82 and second portion 88. In some embodiments, the step portion 85 may be configured such that, for a target wavelength, there are no layers with an optical thickness close to a quarter-wave at the target wavelength (i.e., the multi-layer optical film is not strongly reflective as the target wavelength since none of the layers of the film are resonant at the target wavelength). That is, by positioning step portion 85 so that certain layer thicknesses are avoided in the overall layer thickness gradient, the optical film will not block or reflect (i.e., they will substantially transmit) wavelengths of light that would normally resonate with the omitted layers).

Figure 6C:
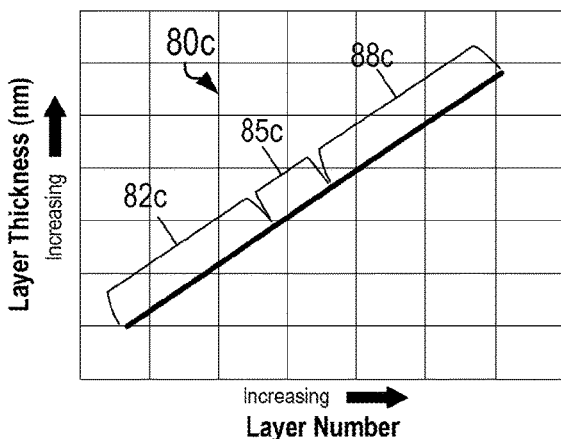

FIGS. 6A-6C provide plots of alternate layer thickness profiles for an optical film for two-factor authentication. Similar to the plot shown in FIG. 5, each of the plots in FIGS. 6A-6C represent a layer thickness gradient 80a, 80b, 80c which is a plot of layer thickness in nanometers (nm) on the y-axis versus layer number on the x-axis. Each of the layer thickness gradients 80a, 80b, 80c includes a first portion 82a, 82b, 82c and a second portion 88a, 88b, 88c which are substantially linear portions, separated by a step portion 85a, 85b, 85c. In FIG. 6A, showing embodiments 80a, the first portion 82a shows a gradual decrease in layer thickness as the layer number increases, step portion 85a shows a much steeper drop in layer thickness, and second portion 88a shows a gradual increase in layer thickness. The embodiment shown in FIG. 6B, showing embodiments 80b, the first portion 82b shows a gradual increase in layer thickness as the layer number increases, step portion 85b shows a steep drop in layer thickness, and second portion 88b shows a gradual decrease in layer thickness. In each of the embodiments 80a and 80b, the step portions 85a and 85b may be configured such that, for a target wavelength, there are no layers with an optical thickness close to a quarter-wave at the target wavelength, similar to the embodiment 80 described in FIG. 5 (i.e., the multi-layer optical film is not strongly reflective as the target wavelength since none of the layers of the film are resonant at the target wavelength). In some embodiments, the step portion may have a negative slope (a "step down", as with step portions 85a, 85b), while in other embodiments, the step portion may have a positive slope (a "step up", as with step portion 85, FIG. 5, or step portion 85c).

Embodiment 80c in FIG. 6C, however, achieves the same effect by changing the "optical thickness" of the layers across the gradient, rather than the physical layer thickness gradient. That is, the layers in each of first portion 82c and second portion 88c exhibit a refractive index difference between alternating layers, and step portion 85c may have layers that exhibit no difference in refractive index between successive layers, or, alternately, a difference in refractive index that is different than the difference exhibited by first portion 82c and second portion 88c. That is, even though the layer thickness gradient across the plot 80c is continuous, the step portion 85c may be configured such that, for a target wavelength, there are no layers with an optical thickness close to a quarter-wave at the target wavelength. In embodiments 80 (FIG. 5), 80a, and 80b, the optical thickness is controlled by a physical layer thickness gradient, and in embodiment 80c, the optical thickness is controlled by varying the refractive indices in the layers to achieve a similar difference in optical thickness. The embodiments shown in FIGS. 6A-6C are examples only and are not intended to be limiting. Other layer thickness gradients are possible within the scope of the present disclosure.

Figures 7A, 7B, 7C:
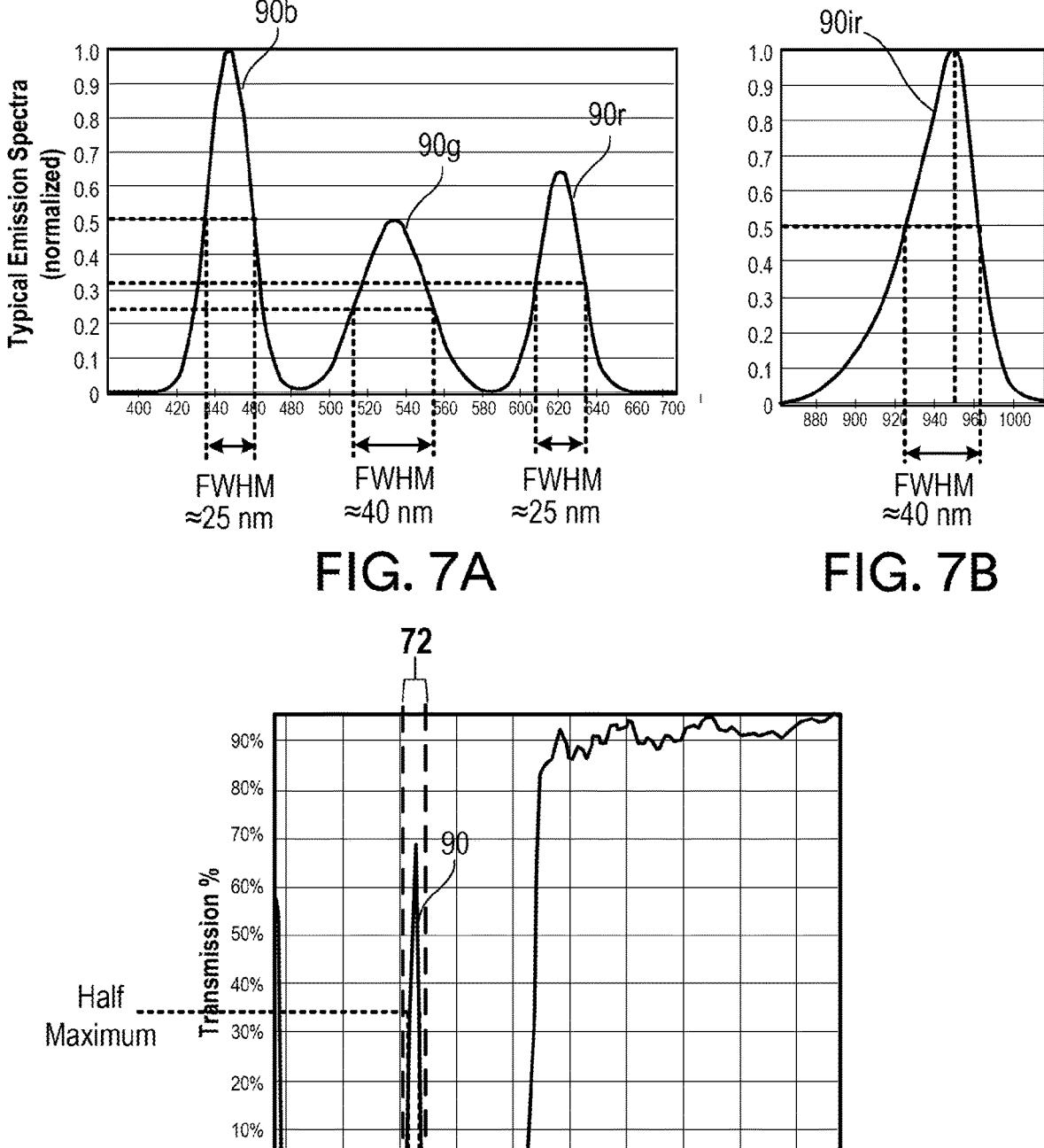
FIGS. 7A-7C compare the emission spectra for various lighting sources versus the transmission performance of an optical film for two-factor authentication, in accordance with an embodiment of the present description.

FIGS. 7A and 7B are discussed elsewhere herein and provide typical emission spectra for light-emitting diode light sources, including blue emission spectra 90b, green emission spectra 90g, red emission spectra 90r, and near infrared emission spectra 90ir, as well as the corresponding FWHM values for each of the spectra curves. FIG. 7C is similar to the graph of FIG. 3 and is provided here for the purpose of comparing plot 90 to the emission spectra in FIGS. 7A-7B. It can be seen from FIG. 7C that the FWHM of the second wavelength range 72 is less than the FWHM of each of the emission spectra 90b, 90g, 90r, and 90ir as shown in FIGS. 7A and 7B.

Figure 8:
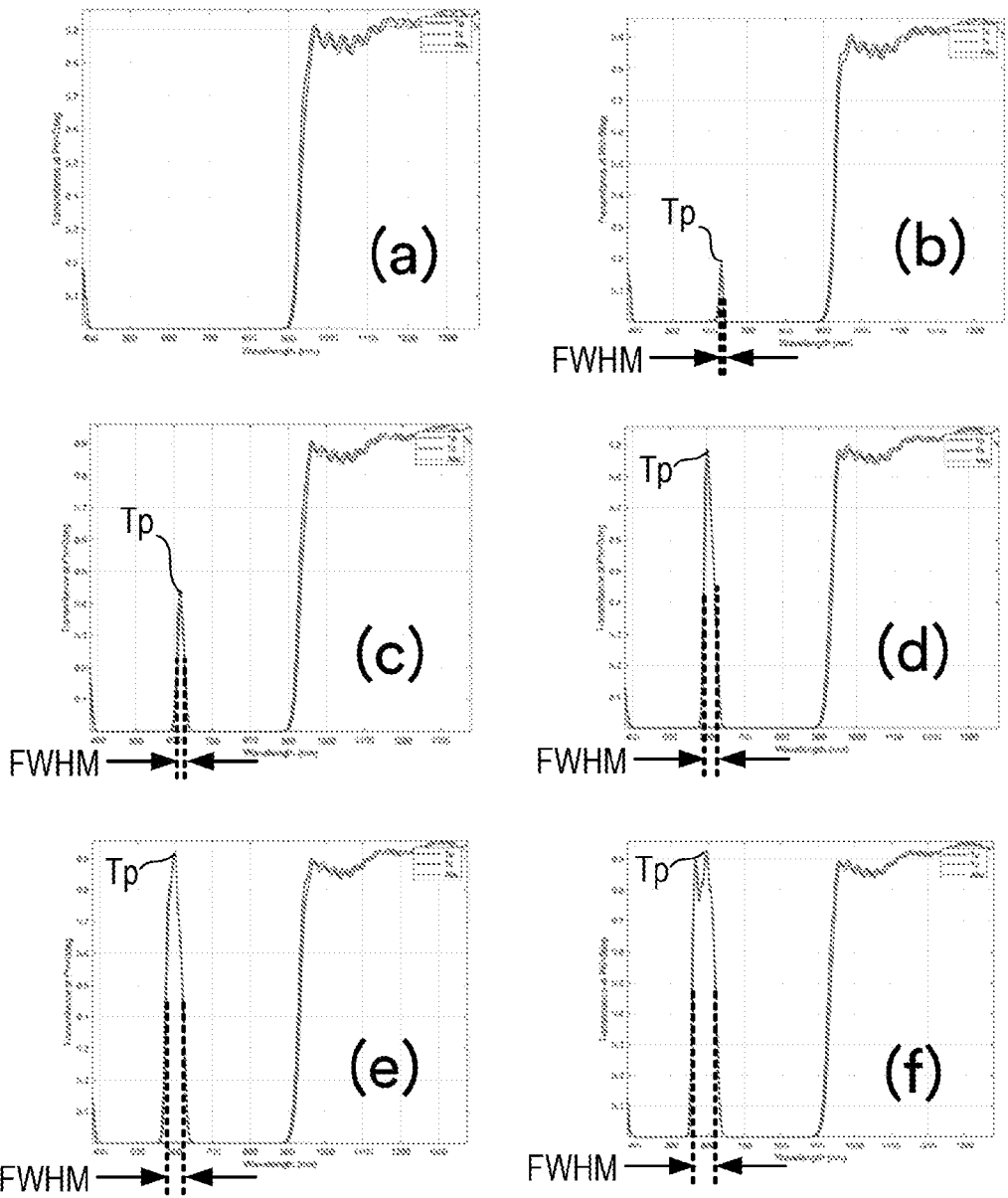
FIG. 8 shows plots of the optical transmission of several variants of an optical film for two-factor authentication, in accordance with an embodiment of the present description.
Figure 9:
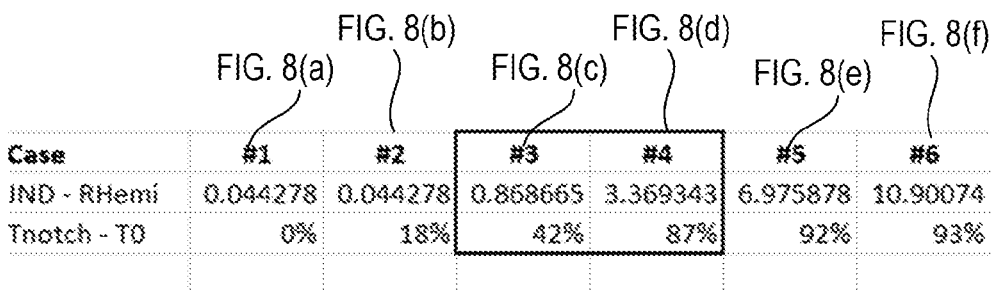
FIG. 9 provides a plot and data on color differences between an emitted light and light reflected by an optical film, in accordance with an embodiment of the present description.
Figure 9:
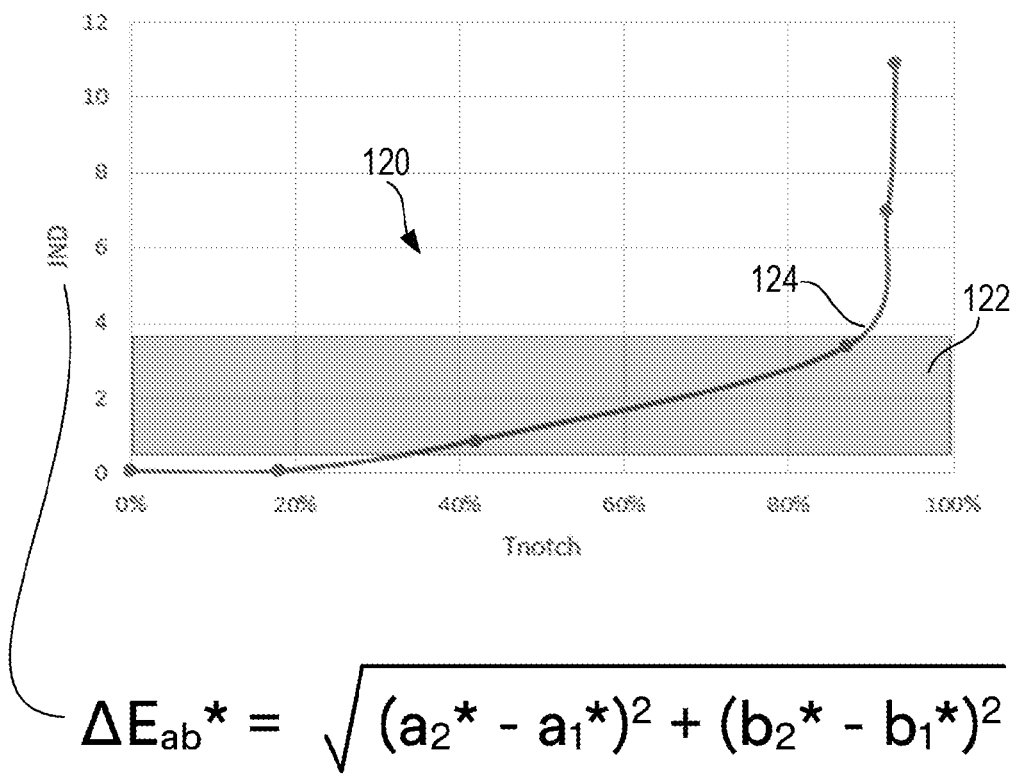

FIG. 8 shows plots of the optical transmission of several variants of an optical film for two-factor authentication. FIG. 9 provides a plot and data on color differences between an emitted light and light reflected by an optical film according to the present description. FIGS. 8 and 9 should be reviewed together for the following discussion. FIG. 8 shows several variations (a) through (f) of optical transmission plots similar to plot 90 shown in FIGS. 3 and 7C. In each variation, the magnitude, or height, of the peak transmission percentage Tp and the FWHM of the plot is different, both gradually increasing from variation (a) through variation (f). These variations can be achieved by adjusting the layer thickness profile of the optical film (e.g., optical film 100, FIG. 1A) as previously described herein to achieve the desired values for Tp and FWHM. In some embodiments, it is desirable to limit both the height of Tp and the FWHM so that the color coordinates measured in light reflected from (or passing through) the optical film are not noticeably different from the light emitted by a light source. That is, enough light must "leak through" the film at a wavelength near peak transmission Tp to enable the use of that wavelength (e.g., a red wavelength passing through to an optical sensor for biometric authentication) while not noticeably affecting the color perceived by an operator on a display in which the optical film is being used. In some embodiments, for example, the embodiment shown in FIG. 8(b) or FIG. 8(c) may have a high enough Tp to enable the desired functionality, while still having a low enough magnitude for Tp and a narrow FWHM to avoid perceptible color shifts on the associated display.

FIG. 9 represents a plot 120 of the color difference between the emitted light (signal) versus the recycled light (light reflected by the optical film) for each of the embodiments of the film represented in FIG. 8(a) through FIG. 8(f). At the top of the graph, the table shows the measured values in transmission percentage (shown as Tnotch, representing peak transmission Tp on the corresponding graph in FIG. 8) and the color difference between the emitted light and reflected light (labeled as JND, or "just noticeable difference"). The formula for the value of JND is shown below the graph in FIG. 9, which represents a delta (change) in value between a first set of color coordinates (a1,b1) and a second set of color coordinates (a2,b2), or $\Delta E^*(ab)$, as measured using a CIE Lab color space. A gray box on the graph represents the area 122 of the graph that happens before a sharp knee bend 124 in plot 120. As shown in plot 120, the lower the value of peak transmission, Tp, the lower the value of color difference JND, and, after knee bend 124, the JND value climbs steeply after approximately 90% Tp. The width of the associated FWHM will also make a difference, as a greater number of wavelengths of light are affected by increasing FWHM.

In some embodiments, the optical film (e.g., optical film 100, FIG. 1A) may be configured such that an optical transmittance versus wavelength for the optical film includes a bandpass segment with a global peak transmittance of between about 2% and about 80%, or between about 2% and about 60%, or between about 2%, and about 40%, at a global peak wavelength in a visible wavelength range and a corresponding full width at half maximum (FWHM) of between about 10 nm and about 50 nm, or between about 10 nm and about 40 nm, or between about 10 nm and about 30 nm, or between about 10 nm and about 20 nm.

Figure 10:
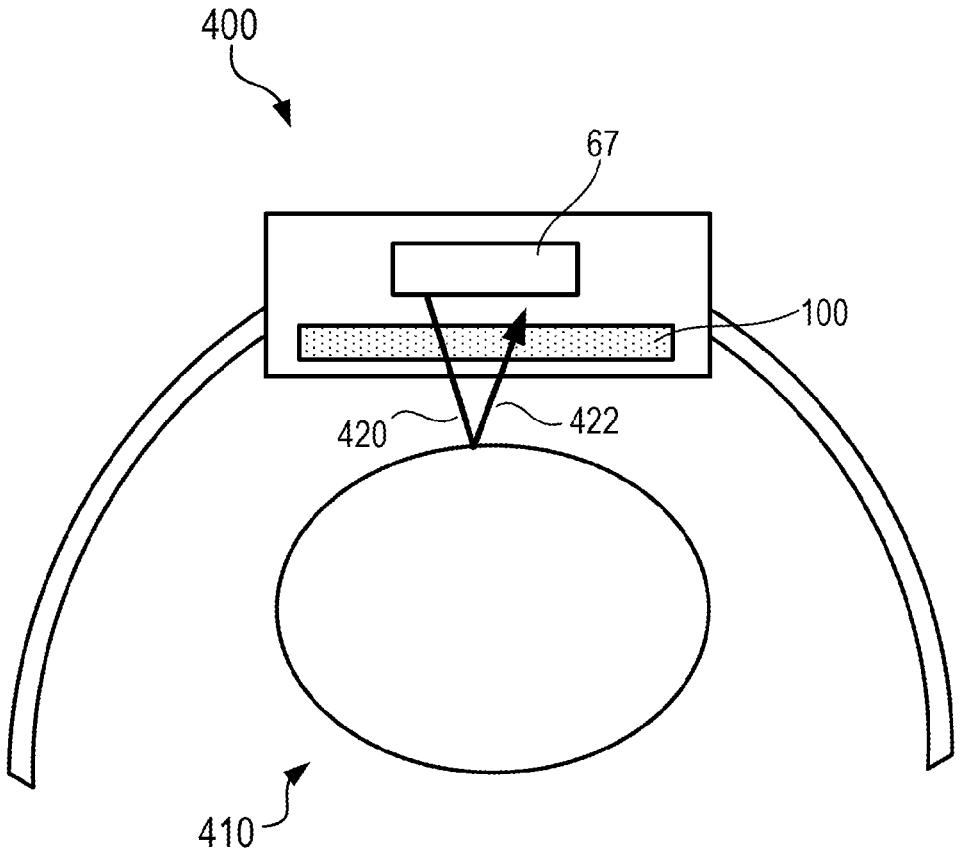
FIG. 10 is a side view of an optical system including a transceiver and an optical film, in accordance with an embodiment of the present description.

Optical films according to the present description may be used in various optical systems and embodiments beyond the examples contained herein. For example, FIG. 10 provides one embodiment of an optical system 400 (e.g., a smart watch) which includes a transceiver 67 and an optical film 100 (or any of the embodiments of an optical film according to the present description). In some embodiments, transceiver 67 is configured to emit emitted light 420 toward a measurement subject 410 (e.g., the skin on the wrist of a user) and receive reflected light 422 reflected by measurement subject 410. In some embodiments, optical film 100 is disposed between transceiver 67 and measurement subject 410. In some embodiments, emitted light 420 includes at least one of wavelengths of light in a human-visible wavelength range and wavelengths of light in an infrared wavelength range.

Terms such as "about" will be understood in the context in which they are used and described in the present description by one of ordinary skill in the art. If the use of "about" as applied to quantities expressing feature sizes, amounts, and physical properties is not otherwise clear to one of ordinary skill in the art in the context in which it is used and described in the present description, "about" will be understood to mean within 10 percent of the specified value. A quantity given as about a specified value can be precisely the specified value. For example, if it is not otherwise clear to one of ordinary skill in the art in the context in which it is used and described in the present description, a quantity having a value of about 1, means that the quantity has a value between 0.9 and 1.1, and that the value could be 1.

Terms such as "substantially" will be understood in the context in which they are used and described in the present description by one of ordinary skill in the art. If the use of "substantially equal" is not otherwise clear to one of ordinary skill in the art in the context in which it is used and described in the present description, "substantially equal" will mean about equal where about is as described above. If the use of "substantially parallel" is not otherwise clear to one of ordinary skill in the art in the context in which it is used and described in the present description, "substantially parallel" will mean within 30 degrees of parallel. Directions or surfaces described as substantially parallel to one another may, in some embodiments, be within 20 degrees, or within 10 degrees of parallel, or may be parallel or nominally parallel. If the use of "substantially aligned" is not otherwise clear to one of ordinary skill in the art in the context in which it is used and described in the present description, "substantially aligned" will mean aligned to within 20% of a width of the objects being aligned. Objects described as substantially aligned may, in some embodiments, be aligned to within 10% or to within 5% of a width of the objects being aligned.

All references, patents, and patent applications referenced in the foregoing are hereby incorporated herein by reference in their entirety in a consistent manner. In the event of inconsistencies or contradictions between portions of the incorporated references and this application, the information in the preceding description shall control.

Descriptions for elements in figures should be understood to apply equally to corresponding elements in other figures, unless indicated otherwise. Although specific embodiments have been illustrated and described herein, it will be appreciated by those of ordinary skill in the art that a variety of alternate and/or equivalent implementations can be substituted for the specific embodiments shown and described without departing from the scope of the present disclosure. This application is intended to cover any adaptations or variations of the specific embodiments discussed herein. Therefore, it is intended that this disclosure be limited only by the claims and the equivalents thereof.

What is claimed is:

1. An optical film, comprising:
a plurality of polymeric layers numbering at least 200 in total disposed between, and co-extruded and co-stretched with, opposing first and second outer layers, each of the polymeric layers having an average thickness of less than about 150 nm, wherein a layer thickness gradient of the optical film comprises first and second portions joined by a step portion, each of the first and second portions extending across at least 30 of the polymeric layers, the step portion extending across less than about 10 of the polymeric layers, a change in thickness across the step portion at least 5 times greater than a change in thickness across each of the first and second portions, and wherein within the step portion successive layers exhibit a refractive index difference that is substantially zero relative to alternating layers in the first and second portions,
wherein the optical film has a first average transmission percentage TA1 in a first wavelength range, a peak transmission percentage Tp in a different second wavelength range, and the first wavelength range and the second wavelength range are separated by a third wavelength range with a third average transmission percentage TA3, each of the first and third wavelength ranges at least about 100 nm wide, the second wavelength range less than about 50 nm wide, TA1>Tp>30

(TA3), and wherein the step portion is configured such that, for a target wavelength the second wavelength range, no polymeric layer has an optical thickness within about +10% of $\lambda/4$ at that wavelength.

2. An optical system, comprising:
a transceiver configured to emit emitted light toward a measurement subject and receive reflected light reflected by the measurement subject; and
the optical film of claim 1 disposed between the transceiver and the measurement subject, the emitted light comprising at least one of wavelengths of light in the first wavelength range and wavelengths of light in the second wavelength range.

3. The optical film of claim 1, wherein each of the first and second portions are substantially linear portions.

4. The optical film of claim 3, wherein a best linear fit to each of the first and second substantially linear portions has an R-squared value greater than or equal to 0.8.

5. The optical film of claim 1, wherein the step portion has a negative slope.

6. The optical film of claim 1, wherein the step portion has a positive slope.

7. The optical film of claim 1, wherein the optical film is selected from a group consisting of a reflector, a reflective polarizer, an absorbing polarizer, partial reflector, and a diffuser.

8. The optical film of claim 1, wherein the first wavelength range extends from about 800 nm to about 2000 nm, the second wavelength range extends from about 550 nm to about 700 nm.

9. The optical film of claim 1, wherein the first wavelength range is one of a visible and a near infrared wavelength range, and the second wavelength range is the other of the visible and the near infrared wavelength range.

10. The optical film of claim 1, wherein TA1 is greater than 80%.

11. The optical film of claim 1, wherein TA1 is greater than 90%.

12. The optical film of claim 1, wherein Tp is greater than 30%.

13. The optical film of claim 1, wherein Tp is greater than 40%.

14. The optical film of claim 1, wherein the second wavelength range is less than about 30 nm wide.

15. An optical stack comprising two or more of the optical films of claim 1, wherein at least one optical characteristic for at least one of the two or more of the optical films varies by at least 10 percent for two orthogonal polarization states, and the at least one optical characteristic for the other of the two or more of the optical films is substantially the same for the two orthogonal polarization states.

16. The optical stack of claim 15, wherein the at least one optical characteristic is optical transmission.

17. The optical stack of claim 15, wherein the at least one optical characteristic is optical reflectance.

18. An optical system, comprising a display configured to emit light having blue, green, red, and near infrared emission spectra having respective blue, green, red, and near infrared full width at half maximum (FWHM), and the optical film of claim 1, wherein a FWHM corresponding to the peak transmission in the second wavelength range is less than at least each of the green, red, and near infrared FWHMs.

19. An optical stack comprising two or more of optical films, wherein at least one optical characteristic for at least one of the two or more of the optical films varies by at least 10 percent for two orthogonal polarization states, and the at least one optical characteristic for the other of the two or more of the optical films is substantially the same for the two orthogonal polarization states, wherein each optical film of the two or more optical films comprises:

a plurality of polymeric layers numbering at least 200 in total disposed between, and co-extruded and co-stretched with, opposing first and second outer layers, each of the polymeric layers having an average thickness of less than about 150 nm, wherein a layer thickness gradient of the optical film comprises first and second portions joined by a step portion, each of the first and second portions extending across at least 30 of the polymeric layers, the step portion extending across less than about 10 of the polymeric layers, a change in thickness across the step portion at least 5 times greater than a change in thickness across each of the first and second portions, wherein each optical film of the two or more optical films has a first average transmission percentage TA1 in a first wavelength range, a peak transmission percentage Tp in a different second wavelength range, and the first wavelength range and the second wavelength range are separated by a third wavelength range with a third average transmission percentage TA3, each of the first and third wavelength ranges at least about 100 nm wide, the second wavelength range less than about 50 nm wide, TA1>Tp>30 (TA3).

* * * * *